(No Model.)

J. M. WHITTEMORE.
FASTENING FOR BELTS.

No. 391,103. Patented Oct. 16, 1888.

Witnesses,
Chas. J. Williamson,
Henry C. Hazard.

Inventor,
James M. Whittemore
by Prindle and Russell
his Attorneys.

United States Patent Office.

JAMES M. WHITTEMORE, OF WEST TROY, NEW YORK, ASSIGNOR OF ONE-HALF TO GEORGE S. PRINDLE AND PHILIP G. RUSSELL, OF WASHINGTON, DISTRICT OF COLUMBIA.

FASTENING FOR BELTS.

SPECIFICATION forming part of Letters Patent No. 391,103, dated October 16, 1888.

Application filed October 21, 1887. Serial No. 253,003. (No model.)

*To all whom it may concern:*

Be it known that I, JAMES M. WHITTEMORE, of West Troy, in the county of Albany, and in the State of New York, have invented certain new and useful Improvements in Fastenings for Belts, &c.; and I do hereby declare that the following is a full, clear, and exact description thereof, reference being had to the accompanying drawings, in which—

Figure 1:
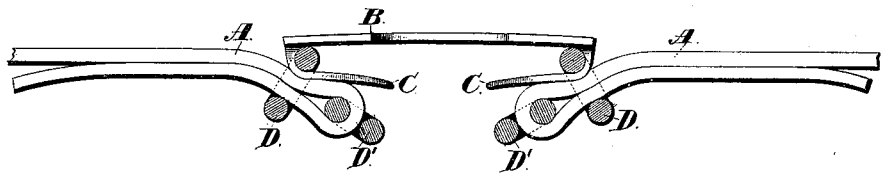
Figure 2:
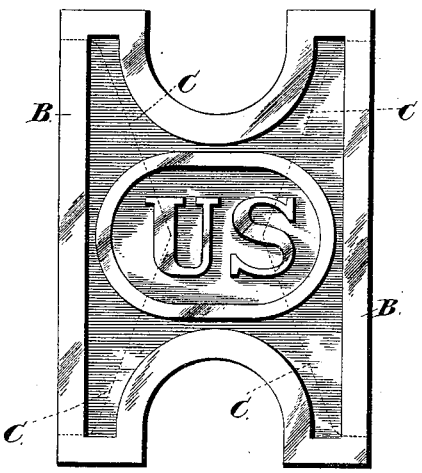
Figure 3:
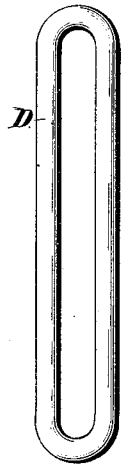

Figure 1 shows a plan view of the end portions of a belt connected by means of my improved fastening; Fig. 2, a detail view of the connecting-plate, such as is used for a cartridge-belt; and Fig. 3, a detail view of one of the rings detached.

Letters of like name and kind refer to like parts in each of the figures.

The object of my invention is to provide an improved fastening for connecting the end portions of belts and bands of all kinds; and to this end my invention consists in the fastening, and in the construction, arrangement, and combination of the parts thereof, as hereinafter specified.

I have shown my invention as applied to the fastening of a military cartridge-belt, but desire it to be understood that it is applicable for fastening or connecting together the ends of many kinds of belts, bands, ropes, cords, &c.

In the drawings, A A designate the end portions of a cartridge belt or band, and B designates the connecting-plate, (shown as a United States cartridge-belt plate.) Said plate is on its rear or inner side provided at each end with a flat broad hook, C, consisting of a flat thin plate turned and extending inward a short distance in a direction substantially parallel to the back of plate B. These hooks can be formed of extensions of the material of the plate, preferably flattened and thinned somewhat, or they can be made separately and attached or fixed in place in any desired way. For connecting each end of the belt A with the belt, and fastening the belt as adjusted, there are two rings, D and D'.

In putting the fastening on the belt each end of the latter is passed inward through ring D, then through ring D', as shown in Fig. 1, and then back out through the ring D parallel to but behind the portion of the belt passing inward to ring D'. The hooks C C on the plate B are then hooked into the two rings D D on the front side of the belt. The rings D' D' are made like rings D D, and of substantially the same size and shape. It is sufficient, however, if they be made large and thick enough, so that with the turn of the belt around their sides, as shown and described, they cannot pass or be pulled through the rings D D. With the belt or band end passed inward through a ring, D, looped around one side of ring D', and passed outward again through ring D, obviously any outward pull on the belt or band will cause portions of it to be clamped between the part of ring D' around which the belt is looped and the two sides of ring D. The stronger the pull the firmer and harder will the belt or band be clamped and held. The plate B, with its hooks engaging the rings D D, simply serves as a connecting-piece to connect the rings together and hold them against the force of any outward pull on the belt ends.

All the rings used can be formed of bent wire with the ends brazed or otherwise joined together, or their ends can be left unjoined if the wire is stout and strong.

I contemplate using my fastening for connecting or fastening the ends of all sorts of straps, bands, belts, &c.

Where only one end of a strap or band is to be fastened, only one pair of rings is necessary, of which the ring D can be attached in any desired way to the part or piece to which the band end is to be fastened or connected.

I have described the piece through which the belt or band is passed after passing through ring D as being a ring. Obviously, however, it need not be a full or complete ring. It is sufficient if it is a mere bar with its ends turned over inward, so as to overlap the belt or band sufficiently to prevent the bar from accidentally slipping or getting out of the bend or loop in the belt.

For some purposes, where there is no chance of the bar working or dropping out of the belt-loop, it can be a simple straight bar, or one with lugs or single bends at its ends to engage the belt sides or edges.

When my fastening is in use, the belt or band can be drawn up or shortened, as desired, by drawing the ring D' away from the ring D and then pulling more of the belt through the rings. The belt is free to be thus pulled or slid through the rings, as it is not then clamped or pinched against the inner sides of ring D.

Having thus described my invention, what I claim is—

1. In combination with a connecting plate or piece having a hook, the ring engaged by the hook, the belt or band passed inward and then outward through the ring, and the ring or loop on the belt at its bend, substantially as and for the purpose specified.

2. In combination with the plate provided with the two hooks, the belt looped at each end, the two rings through which the belt is looped, and the two rings encircling the two thicknesses of the belt at points outside of the former rings, substantially as and for the purpose set forth.

In testimony that I claim the foregoing I have hereunto set my hand this 12th day of July, 1887.

JAMES M. WHITTEMORE.

Witnesses:
CHARLES WALTERS,
T. I. HARDIN.